June 6, 1961 S. B. McLEOD 2,987,049
CYLINDER AND VALVE ASSEMBLY
Filed March 29, 1957 2 Sheets-Sheet 1
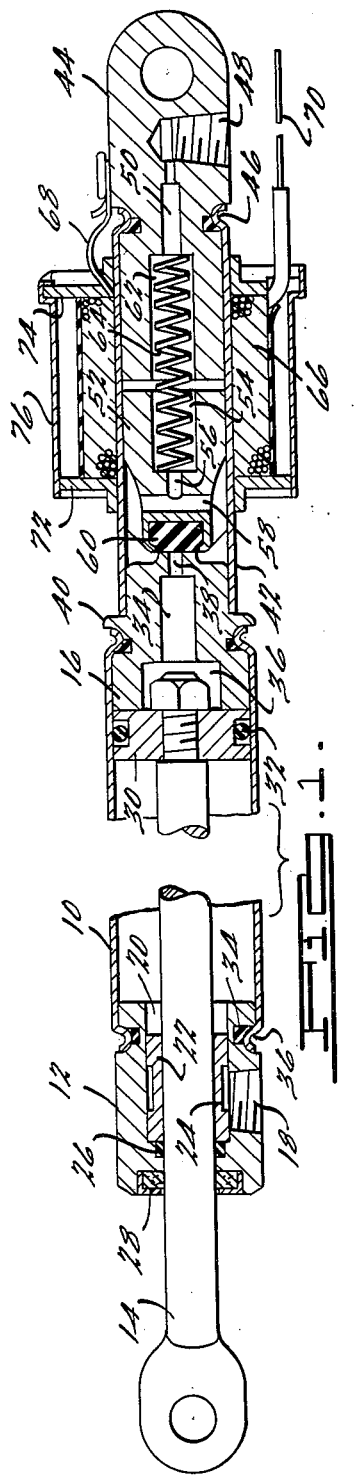
INVENTOR.
Stewart B. McLeod.
BY
M R Murphy
ATTORNEY.

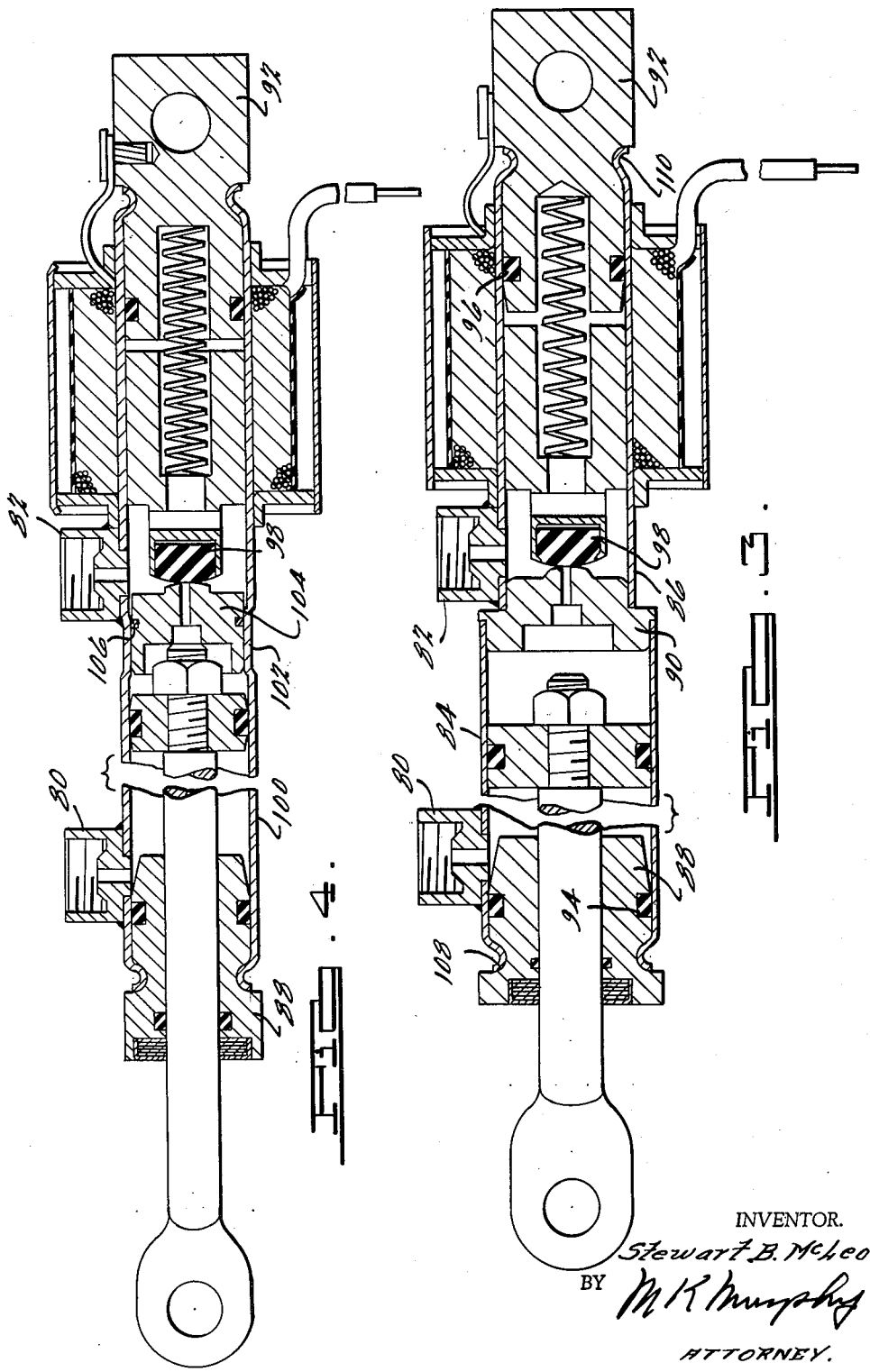

2,987,049
CYLINDER AND VALVE ASSEMBLY
Stewart B. McLeod, Toledo, Ohio, assignor to Dura Corporation, a corporation of Michigan
Filed Mar. 29, 1957, Ser. No. 649,543
1 Claim. (Cl. 121—44)

This invention relates to improvements in hydraulic cylinder and valve assemblies. It pertains particularly to a high pressure cylinder, capable of withstanding pressures in the order of 2000 pounds per square inch, with built-in valve means for locking the piston in any desired position of the stroke thereof.

The primary object of the invention is to provide a compact, low-cost, cylinder and valve assembly of the aforesaid type with the solenoid for actuating the valve disposed outside the cylinder proper and with the solenoid coil protected from contact with the hydraulic fluid.

Other objects and advantages of my improved construction will be apparent from the following description which, taken in conjunction with the accompanying drawings, illustrates preferred embodiments of the invention.

In the drawing:
FIG. 1 is a longitudinal sectional view of the cylinder and valve assembly;
FIG. 2 is a plan view of the same;
FIG. 3 is a longitudinal sectional view of a modified cylinder and valve assembly; and
FIG. 4 is a similar view of another modification.

Referring now to FIGS. 1 and 2, it will be seen that my improved hydraulic motor comprises a section of tubing 10 of sufficient length to provide the piston stroke desired, an end member 12 through which the piston rod 14 slides, and an end member 16 which acts as a piston stop and provides a mounting means for the valve section of the assembly as will be described.

The end member 12 is of machined steel or die-cast construction. A port 18 suitably threaded for receiving a conduit connection fitting communicates with an internal chamber 20 which is open to the cylinder interior. A bushing 22 is fitted into the chamber 20 to provide a sliding support for the piston rod 14. The bushing has a circumferential groove 24 and a plurality of longitudinal grooves (not shown) to permit fluid flow into and out of the cylinder through the port 18. An O-ring seal 26 is disposed around the piston rod adjacent the end of the bushing, and a combination seal 28 is fixed in the outer end of the member 12 to seal the cylinder against leakage.

A piston 30 is fixed to the inner end of the rod 14 and an O-ring 32 is disposed in a circumferential groove provided as shown to prevent leakage of fluid past the piston.

The end member 12 is provided with a circumferential groove which carries an O-ring 34. Assembly of the tube 10 and end member is accomplished by rolling the end portion of the tube into the groove and compressing the O-ring as shown.

The other end member 16 is of steel or die-cast construction also and is assembled with the tube 10 as above described. The end member 16 has internal passages 34, 36, and a port 38 for accommodating fluid flow into and out of the cylinder at the lower end.

The casting 16 is provided with a radial flange 40 against which the rolled end of the tube 10 seats. On the opposite side of the flange the member 16 has a cylindrical extension of reduced diameter which mates with a tube 42. The latter is suitably fixed to the member 16 by press-fitting or brazing and constitutes the housing of the electromagnetic valve. An elongated end member 44 of ferrous material is inserted into the outer end of the tube 42 and the parts are sealed at 46 as illustrated.

The end member 44 has a threaded port 48 and a passage 50 for accommodating fluid flow. Slidably disposed in the tube 42 between the members 16 and 44 is a plunger 52 of ferrous material. The plunger is formed with fluid passages 54, 56 and 58, and carries a yieldable valve element 60 in its inner end portion. The passage 54 is aligned with a similar passage 62 formed in the member 44 and a coil spring 64 disposed in these passages constantly urges the valve element 60 into sealing engagement with the port 38.

Surrounding the tube 42 is a solenoid coil 66 having external conductors 68, 70.

A pair of flanged rings 72, 74, are brazed or otherwise secured to the tube 42 in spaced relation, and a short section of tubing 76 of relatively large diameter is secured to the rings thereby to provide a housing for the coil 66. The tube 76 may be of any suitable material such as metal or plastic, and the tubes 10 and 42 are preferably of aluminum or steel. While use of a non-ferrous material for the tube 42 tends to improve the efficiency of the solenoid, steel tubing has been found satisfactory in use.

It will be understood that the cylinder just described is adapted for use as a power operator for closures, beds, or the like, where it is necessary to move a part in opposite directions by power means and to lock the part in desired position. The cylinder is preferably used with a motor driven pump as a part of a closed hydraulic system and so long as the plunger 52 and valve element 60 are in the spring-urged position shown, the port 38 is sealed and fluid cannot enter or be withdrawn from either end of the cylinder. Energization of the coil 66 will cause the plunger 52 to move toward the right to take up the clearance between it and the member 44, at the same time uncovering the port 38.

The port 38 will remain uncovered so long as the coil 66 remains energized and fluid can enter or leave the cylinder through the ports and passages 18, 24, 20, 36, 34, 38, 58, 56, 54, 62, 50 and 48, in accordance with the desired direction of piston movement. De-energization of the coil causes the plunger 52 to return to sealing relationship instantly and lock the piston against movement.

FIG. 3 illustrates a modified design of cylinder wherein the inlet-outlet ports 80, 82, comprise fabricated parts secured to the tubular portion of the cylinder instead of being formed in the end members. The ports are preferably screw-machine parts and are brazed to the walls of the tubes 84, 86.

In this design, the end members 88, 90 and 92, are also screw-machine parts and are brazed to the tubes 84, 86. O-rings 94 and 96 are disposed in grooves provided in the members 88 and 92, and these O-rings are located some distance away from the ends of the tubes. The rings are compressed when the parts are assembled before brazing and provide an effective seal.

It will be noted that the member 88 itself provides good support for the slidable piston rod because of the absence of passageways in the end member. The location of the port 82 in the vicinity of the valve 98 makes it unnecessary to provide fluid passages in the member 92.

The cylinder shown in FIG. 3 is extremely economical in construction in that it comprises parts adapted to be made on automatic machinery which are easily assembled and the entire assembly then placed in a brazing furnace.

FIG. 4 is a modified version of the cylinder wherein the power section and the electromagnetic valve section are housed in a single piece of tubing. This form of the invention is otherwise similar to that shown in FIG. 3.

The FIG. 4 cylinder assembly comprises a single section of tubing 100 which has been reduced in diameter through a portion of its length as indicated at 102. A separator member 104 is inserted through the right-hand end of the tube and is brazed in place. The member 104 constitutes an abutment for the solenoid plunger valve element 98 and has a groove for an O-ring 106 to insure good sealing between the working end of the cylinder and the valve end.

The reduction in inside diameter of the cylinder at the portion 102 is preferably about five thousandths of an inch. Because the member 104 has this outer diameter, the member 104 may be inserted into the tube and pressed in place without scoring in inner wall of the tube. This is an important feature of the invention.

The FIG. 4 cylinder is made by first sizing a piece of tubing of desired length to provide the reduced portion 102, then cutting openings for the ports 80, 82, which are placed in position. The separator 104 is then inserted and the assembly is placed in a brazing furnace. After brazing, the piston, valve parts, solenoid parts, etc., are assembled in place with the O-ring seals and the tube ends 108, 110, are rolled into the grooves in the members 88, 92.

The cylinder assemblies above described are designed for use in applications where the piston may be locked in a selected position for considerable periods of time under varying temperature conditions. If abnormally high temperature is encountered, leakage due to expansion of the trapped fluid is prevented by operation of the solenoid valve. The valve spring 64 is chosen of sufficient strength to lock the piston under desired operating conditions, but yieldable under a pressure lower than that which would cause leakage around the seals or burst the cylinder wall. When an abnormal pressure is generated in the cylinder, the spring 64 yields and permits escape of fluid past the valve element 60 until the pressure is reduced below the danger point.

It will thus be seen that I have provided an improved cylinder assembly with built-in valve that is compact and easily and economically manufactured.

I claim:

An electrically controlled, double-acting, fluid driven linear actuator comprising, a tubular body, a piston slidable in said body, an end member secured to said body at one end thereof for closing the same and having an aperture therein for slidably receiving a piston rod carried by said piston, a second end member secured to said body at the other end thereof for closing the same and having an axially disposed fluid passage therein, said second end member having a portion extending axially outwardly of said tubular body, a second tubular body secured to said axially extending portion, a slidable valve plunger disposed in said second tubular body operable to close said axially disposed fluid passage, a spring operably associated with said plunger and urging it toward one position of sliding movement, an electromagnetic coil disposed exteriorly of said second tubular body in surrounding relationship thereto and in radial alignment with said plunger whereby energization of said coil will urge said plunger to its other position of sliding movement, a third end member secured to said second tubular body at the outer end thereof for closing the same, a fluid port in said third end member, a fluid passage in said plunger, said port and passage being open to the fluid passage in said second end member when said plunger is in one position of sliding movement.

References Cited in the file of this patent

UNITED STATES PATENTS

| | | |
|---|---|---|
| 2,311,864 | Parsons | Feb. 23, 1943 |
| 2,317,549 | Muller et al. | Apr. 27, 1943 |
| 2,343,265 | Price | Mar. 7, 1944 |
| 2,366,121 | Martin-Hurst | Dec. 26, 1944 |
| 2,456,429 | Parsons | Dec. 14, 1948 |
| 2,468,943 | Parsons | May 3, 1949 |
| 2,478,818 | Geiger et al. | Aug. 9, 1949 |
| 2,479,398 | Parsons | Aug. 16, 1949 |
| 2,586,683 | McLeod | Feb. 19, 1952 |
| 2,638,125 | Parsons | May 12, 1953 |
| 2,682,256 | Bowman | June 29, 1954 |
| 2,759,245 | Tigrett et al. | Aug. 21, 1956 |